Oct. 15, 1963  T. J. KINCAID  3,107,081
LEVER ACTUATED VALVE WITH NOTCHED LATCHING MEANS
Filed May 31, 1961
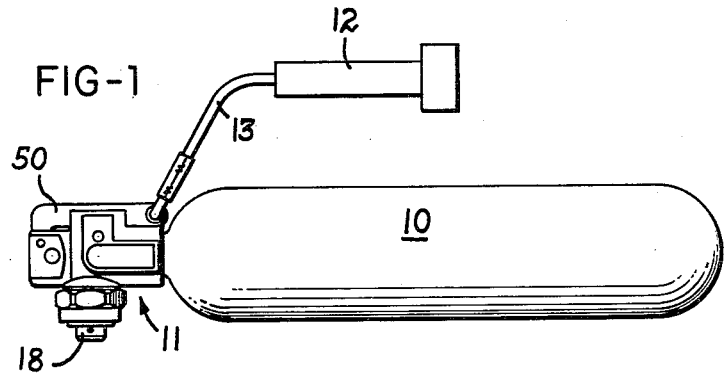
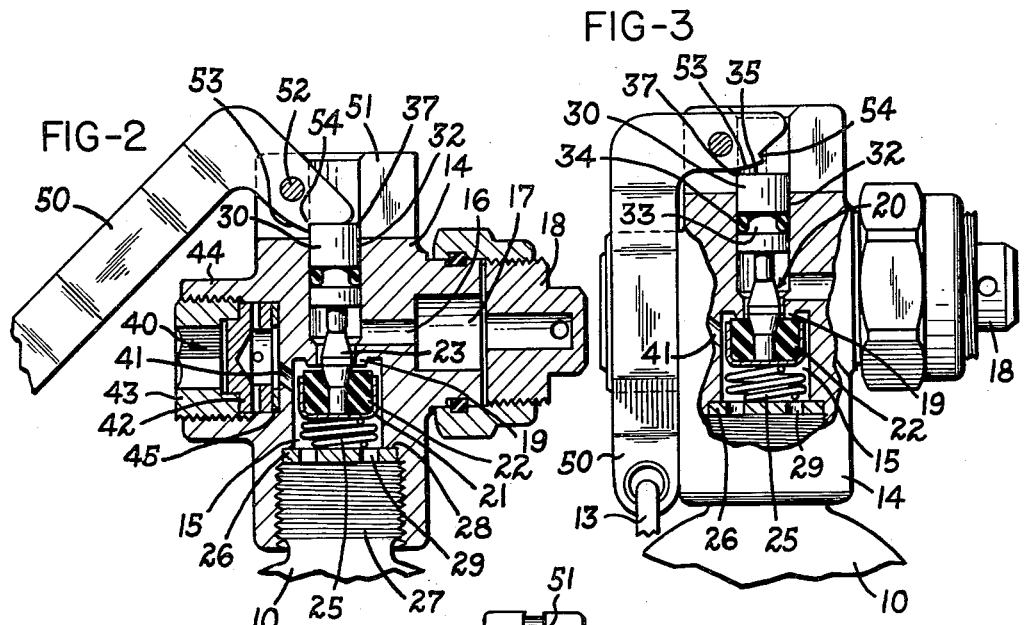
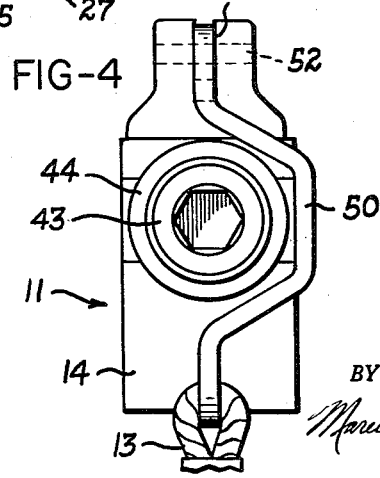
*INVENTOR.*
THOMAS J. KINCAID
BY
Marechal, Biebel, French & Bugg
ATTORNEYS 3,107,081
LEVER ACTUATED VALVE WITH NOTCHED
LATCHING MEANS
Thomas J. Kincaid, Dayton, Ohio, assignor to Aeromarine Manufacturing Company, Delray Beach, Fla., a corporation of Florida
Filed May 31, 1961, Ser. No. 113,743
3 Claims. (Cl. 251—89)

The present invention relates generally to valves and more particularly to valves utilized to release a pressurized fluid from a container.

Containers for pressurized fluids are used extensively in emergency equipment. For example, they are used in fire extinguishers, as a source of pressurized gas for the inflation of life rafts, and as emergency supplies of air for breathing. Many devices presently in use require that an operator give substantial time and attention to the actuation of this emergency equipment. Often the operator is required to hold the valve manually in the open position or to perform a complex set of motions before the valve is opened and the pressurized fluid released. Consequently, the operator's time and attention are diverted from other and more important steps which must be performed. For example, a pilot parachuting into a body of water must clear himself of his parachute gear, maintain himself above the surface of the water, and inflate his life raft. Obviously, any time and attention which might be conserved in the inflation of the life raft can be devoted to the other requirements.

Accordingly, one object of the present invention is to provide an improved valve for the above purpose which is simple to actuate.

Another object of this invention resides in the provision of a valve which can be moved to a permanently opened position by a simple manual operation.

Still another object of this invention is to provide a valve which will automatically lock itself in an open position.

A further object of the invention is to provide a valve which has a minimum number of movable parts, which is simple to actuate, and retains maximum reliability through long periods of storage or inaction.

Other objects and advantages of the invention will be apparent from the following description, the accompanying drawings and the appended claims.

In the drawings—

FIG. 1 is a plan view of a valve in accordance with the present invention mounted on a pressurized fluid container;

FIG. 2 is a sectional view of the valve of FIG. 1 showing the valve in the open position;

FIG. 3 is a view similar to FIG. 2 showing the valve in the closed position; and FIG. 4 is a side view looking from left to right in FIG. 3.

Referring to the drawing, which shows a preferred embodiment of the invention, FIG. 1 illustrates a pressurized fluid container 10 having a valve assembly 11 secured to the neck thereof in any conventional manner, for example, by a threaded connection as shown in FIG. 2. As will be explained in more detail hereinafter, the valve assembly is actuated by a short, simple pull of the handle 12 which is connected to the valve assembly 11 by a flexible cord or wire 13.

Within the valve housing 14 are fluid passages 15 and 16 which provide communication between the interior of the pressurized fluid container 10 and the outlet port 17, the latter being shown as closed by a plug 18 which is employed only for protection during shipping and is removed when the valve is suitably connected for use to an inflatable life raft or the like. Flow between the passages 15 and 16 is controlled by an annular valve seat 19 and a poppet valve unit 20 which includes a cup shaped metallic housing 21, a sealing member 22 in the housing 21, and a valve stem 23. The stem 23 projects through the seat 19 and insures that the valve will, at all times, be properly aligned with seat 19. The seal member 22 is normally urged toward the valve seat 19 by a spring 25 positioned between the valve housing 21 and the gasket 26 which is retained between the neck 27 of the container 11 and the bottom of the counterbore 28 in the housing 14 and has a plurality of holes 29 therein in order that the pressurized fluid may readily flow therethrough.

A pin 30 forms a continuation of the valve stem 23 but is separate therefrom for convenience of manufacture and assembly. The pin 30 reciprocates in the cylindrical bore 32 in the housing 14, and the circumferential groove 33 around the pin 30 receives an O-ring seal 34 which prevents leakage between the pin 30 and bore 32. One end of pin 30 has a flat surface 35 which forms a substantially square edge 37 with the adjacent side walls of pin 30.

The container 10 may be filled with the valve assembly in place thereon through the filler port indicated generally at 40. It will be noted that this operation can be conducted without unseating or otherwise interfering with poppet valve unit 20. That is, the source of pressure fluid is connected to the filler port 40 and the fluid allowed to flow through passageway 41 until the container 11 is filled. Upon the completion of the filling operation, the source of fluid is disconnected, and a stopper 42 is tightly secured in position by the retainer 43 threaded into the boss 44. A gasket 45 is placed between the stopper 42 and the housing 14 to obviate any possible leakage.

An actuator lever 50 for the valve unit 20 is pivotally mounted in a slot 51 in the valve housing 14 by a pin 52. One end of lever 50 extends in overlying relation with the flat surface 35 of pin 30 and has a cam portion 53 and a notch or shoulder 54 extending transversely across the width thereof. The lever 50 is appropriately formed to fit closely against the housing 15 and around the filler port boss 44, as shown best in FIG. 4.

In operation, when it is desired to release the pressurized fluid within the container 10, the operator merely pulls the handle 12 thereby rotating the lever 50 and causing its cam portion 53 to effect the downward movement of the pin 30, as viewed in FIGS. 2 and 3, with consequent separation of the seal member 22 from its seat 19. Once the notch 54 in the cam 53 engages the edge 37, the pin 30 is locked against upward movement. This, in turn, locks the valve unit 20 in the open position thereby permitting the pressurized fluid in container 11 to flow through passages 15 and 16 through outlet port 17 to the equipment which is associated therewith, e.g., a life raft. In this position of the parts, the spring 25 and the fluid pressure in the container continually exert an upward bias on the valve unit 20 and the pin 30 thereby insuring continuous engagement of the notch 54 and edge 37.

It will accordingly be seen that the invention assures that the valve unit 20 is locked in the open position and cannot be closed by movement of lever 50. The only manner in which the valve might possibly be again seated is by the use of a separate tool which will force the pin 30 downwardly and move the lever 50 back to its initial position, thereby permitting the spring 25 to reseat the valve unit 20. However, for all practical purposes, this valve is permanently locked in the open position.

The valve of the invention thus requires only a quick jerk or pull to open and lock it in open position. Thereafter, the operator is then free to perform any other desired operation with his hands with assurance that the proper operation of the gas container will continue. For example, should the valve assembly be associated with an emergency life raft the operator could merely jerk the handle to inflat the life raft and be free to utilize both hands to free himself of his gear or maintain himself above water until the raft is inflated. It is obvious that the relative simplicity of this device enhances its reliability through long periods of storage and inaction.

While the form of apparatus herein described constitutes a preferred embodiment of this invention, it is to be understood that the invention is not limited to this precise form of apparaus, and that changes may be made therein without departing from the scope of the invention which is defined in the appended claims.

What is claimed is:

1. A valve assembly comprising a valve housing having a passageway therethrough, a valve seat positioned in said passageway, a valve member in said housing mounted for movement with respect to said valve seat between a closed position wherein fluid flow through said passageway is blocked and an open position wherein fluid will flow through said passageway, biasing means urging said valve member toward said closed position, a stem means associated with said valve member for moving said member between said opened and closed positions, said stem means having an end surface and an adjacent side wall parallel to the axis of movement of said stem means, a pivot pin on said housing disposed perpendicularly to said axis of said stem and spaced axially and radially from said end surface when said valve member is in said open position, a lever mounted on said pivot pin for pivotal movement between inactive and active positions, a cam on one end of said lever operable to contact said end surface when said lever is rotated in a clockwise direction toward said active position for moving said valve member to said open position, and a notch in said cam having a lock surface parallel to and engaging said side wall of said stem means when said valve member is in said open position for preventing counterclockwise rotation of said lever from said active to said inactive position thus maintaining said valve member in said open position regardless of the forces applied to said lever.

2. A valve assembly comprising a valve housing having a passageway therethrough, a valve seat positioned in said passageway, a valve member in said housing mounted for movement with respect to said valve seat between a closed position wherein fluid flow through said passageway is blocked and an open position wherein fluid will flow through said passageway, biasing means urging said valve member toward said closed position, a stem means associated with said valve member for moving said member between said opened and closed positions, said stem means having an end surface perpendicular to the axis of movement thereof and an adjacent side wall substantially parallel to said axis, a pivot pin on said housing perpendicular to said axis of said stem and spaced axially and radially from said end surface when said valve member is in said open position, a lever mounted on said pivot pin for angular movement between inactive and active positions, and a transverse notch on one end of said lever which separates said one end into a cam portion and a lock portion, said cam portion positioned between said pivot pin and said notch and engageable with said end surface when said lever is rotated in a first direction for moving said valve member to said open position when said lever is moved to said active position, said notch having a lock surface parallel to and engaging said side wall of said stem means when said valve member is in said open position for preventing rotation of said lever in a direction opposite said first direction from said active to said inactive position, said lock portion engaging said end surface when said lever is in said active position for locking said valve member in said open position.

3. A valve assembly comprising a valve housing having a passageway therethrough, a valve seat positioned in said passageway, a valve member in said housing mounted for movement with respect to said valve seat between a closed position wherein fluid flow through said passageway is blocked and an open position wherein fluid will flow through said passageway, biasing means urging said valve member toward said closed position, a stem means associated with said valve member for moving said valve member between said opened and closed positions, said stem means having an end surface perpendicular to the axis of movement thereof and an adjacent side wall on one end thereof substantially parallel to said axis, a pivot pin on said housing perpendicular to said axis and spaced axially and radially from said end surface when said valve is in said open position, a lever mounted on said pivot pin for movement between inactive and active positions, a cam portion on one end of said lever engageable with said end surface for moving said valve member to said open position when said lever is pivoted in a first direction to said active position, a lock portion on said one end for contacting said end surface when said lever is in said active position for holding said valve member in said open position, and a shoulder on said one end between said cam and lock portions and substantially parallel to said side wall when said lever is in said active position for engagement with said side wall of said stem means when said valve member is in said open position for preventing rotation of said lever in a direction opposite said first direction.

References Cited in the file of this patent

UNITED STATES PATENTS

| 1,412,211 | Martin | Apr. 11, 1922 |
| 1,459,460 | Yardley | June 19, 1923 |
| 2,356,089 | Rice | Aug. 15, 1944 |
| 3,088,522 | Zellner | May 7, 1963 |

FOREIGN PATENTS

| 351,325 | Italy | Mar. 6, 1937 |
| 457,940 | Canada | July 5, 1949 |